(12) United States Patent
Shanks et al.

(10) Patent No.: US 10,298,672 B2
(45) Date of Patent: May 21, 2019

(54) GLOBAL CONTACT-POINT REGISTRY FOR PEER NETWORK DEVICES

(71) Applicant: Cisco Technology, Inc., San Jose, CA (US)

(72) Inventors: Robert Tristan Shanks, San Mateo, CA (US); Jignesh Devji Patel, Fremont, CA (US); Patrick Douglas Verkaik, San Francisco, CA (US); Selahattin Daghan Altas, San Francisco, CA (US); Joseph Morgan Aronow, San Francisco, CA (US); Justin Delegard, San Francisco, CA (US); Dylan Jason Koenig, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 285 days.

(21) Appl. No.: 14/974,290

(22) Filed: Dec. 18, 2015

(65) Prior Publication Data
US 2017/0180307 A1 Jun. 22, 2017

(51) Int. Cl.
*H04L 29/08* (2006.01)
*H04L 29/12* (2006.01)

(52) U.S. Cl.
CPC ........ *H04L 67/104* (2013.01); *H04L 61/2514* (2013.01); *H04L 61/2567* (2013.01)

(58) Field of Classification Search
CPC ............... H04L 67/104; H04L 61/2514; H04L 61/2567
See application file for complete search history.

(56) References Cited

U.S. PATENT DOCUMENTS

| | | | |
|---|---|---|---|
| 7,117,530 B1 | 10/2006 | Lin | |
| 7,120,682 B1 | 10/2006 | Salama | |
| 7,251,824 B2 | 7/2007 | Edwards et al. | |
| 8,108,455 B2* | 1/2012 | Yeager | H04L 67/104 |
| | | | 709/202 |
| 9,372,794 B2* | 6/2016 | Condict | G06F 12/0815 |
| 9,716,733 B2* | 7/2017 | Strigeus | G06F 17/30321 |
| 9,800,464 B2* | 10/2017 | McEntee | H04L 67/1097 |
| 2003/0140142 A1 | 7/2003 | Marples et al. | |
| 2007/0300287 A1* | 12/2007 | Wynne | G06F 21/575 |
| | | | 726/2 |

(Continued)

*Primary Examiner* — Uzma Alam
(74) *Attorney, Agent, or Firm* — Polsinelli PC

(57) ABSTRACT

Previous solutions to the problem of maintaining up-to-date network device addressing, fail to provide systems or processes that efficiently share and obtain addressing information of networking devices in a given network. By contrast, and to that end, various implementations disclosed herein include systems, methods and apparatuses that generate a registry request message, where the registry request message includes a first portion characterized by a first write privilege and a second portion characterized by a second write privilege different from the first write privilege. The systems, methods and apparatuses convey the registry request message to a shared contact point network entity, and obtain a response message addressed from the shared contact point network entity, where the response message includes peer addressing information corresponding to one or more peer network devices associated with the aforementioned systems, methods and apparatuses.

23 Claims, 9 Drawing Sheets

(56) References Cited

U.S. PATENT DOCUMENTS

| | | | |
|---|---|---|---|
| 2008/0155120 A1* | 6/2008 | Argawal | H04L 67/104 709/242 |
| 2008/0183974 A1* | 7/2008 | Lambert | G11C 7/1075 711/149 |
| 2008/0313163 A1* | 12/2008 | Allard | G06F 17/30011 |
| 2009/0168787 A1* | 7/2009 | Ansari | H04L 12/66 370/401 |
| 2010/0161752 A1* | 6/2010 | Collet | H04L 67/104 709/216 |
| 2011/0196900 A1* | 8/2011 | Drobychev | G06F 17/30575 707/812 |
| 2012/0151051 A1* | 6/2012 | Zhang | H04L 67/06 709/224 |
| 2013/0080452 A1* | 3/2013 | Hosie | G06F 17/30557 707/752 |
| 2013/0238650 A1* | 9/2013 | Ghosh | G06Q 10/10 707/758 |
| 2013/0290249 A1* | 10/2013 | Merriman | G06F 17/30578 707/610 |
| 2015/0092603 A1 | 4/2015 | Aguayo | |

* cited by examiner

Contact Point Registry 300

| Device ID | Device Private Contact Point Info | | Device Public Contact Point Info | | Peer Devices | Hub / Spoke |
|---|---|---|---|---|---|---|
| | IP Addr | Port | IP Addr | Port | | |
| A | 10.0.10.0 | 50234 | 10.0.10.0 | 50234 | B, C | Hub |
| B | 172.16.0.2 | 51497 | 24.6.216.39 | 35867 | A | Spoke |
| C | 192.168.1.1 | 60583 | 70.108.34.0 | 41234 | A, D | Hub |
| D | 10.255.0.255 | 61761 | 96.42.255.26 | 56287 | C | Spoke |

FIG. 3A

Local Peer Contact Point Table 350

| Peer Device ID | Peer Device Private Contact Point Info | | Peer Device Public Contact Point Info | | Status |
|---|---|---|---|---|---|
| | IP Addr | Port | IP Addr | Port | |
| B | 172.16.0.2 | 51497 | 24.6.216.39 | 35867 | Online |
| C | 192.168.1.1 | 60583 | 70.108.34.0 | 41234 | Online |

FIG. 3B

GLOBAL CONTACT-POINT REGISTRY FOR PEER NETWORK DEVICES

TECHNICAL FIELD

The present disclosure relates to communication networks, and in particular, to enabling identification of peer network devices in a hosted network management system.

BACKGROUND

As a business organization grows and spreads out to geographically separated branch locations, the associated information technology (IT) network infrastructure often also changes. One aspect of changing IT network infrastructure is the desire to establish and maintain a secure private network among computing machines associated with the business organization. In many cases, private networks between branch locations are established over public networks. One example of this networking technique is site-to-site virtual private network (VPN) deployment. To set up and maintain these private networks, various networking devices such as routers, switches and security appliances are utilized. Deployment of these private networks involves the often-complicated task of configuring these various networking devices to operate and communicate together in the network. A networking device associated with a respective branch location has addressing information used by other networking devices to establish a private network, but this addressing information is variable and out of the control of the network device. For example, to establish a private network over public networking infrastructure, a networking device may use an Internet service provider that provides the networking device with unpredictable and inconsistent addressing information.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 3A is an example of a contact point registry look-up table in accordance with some implementations.

FIG. 3B is an example of a local peer contact point look-up table in accordance with some implementations.

Figure 1:
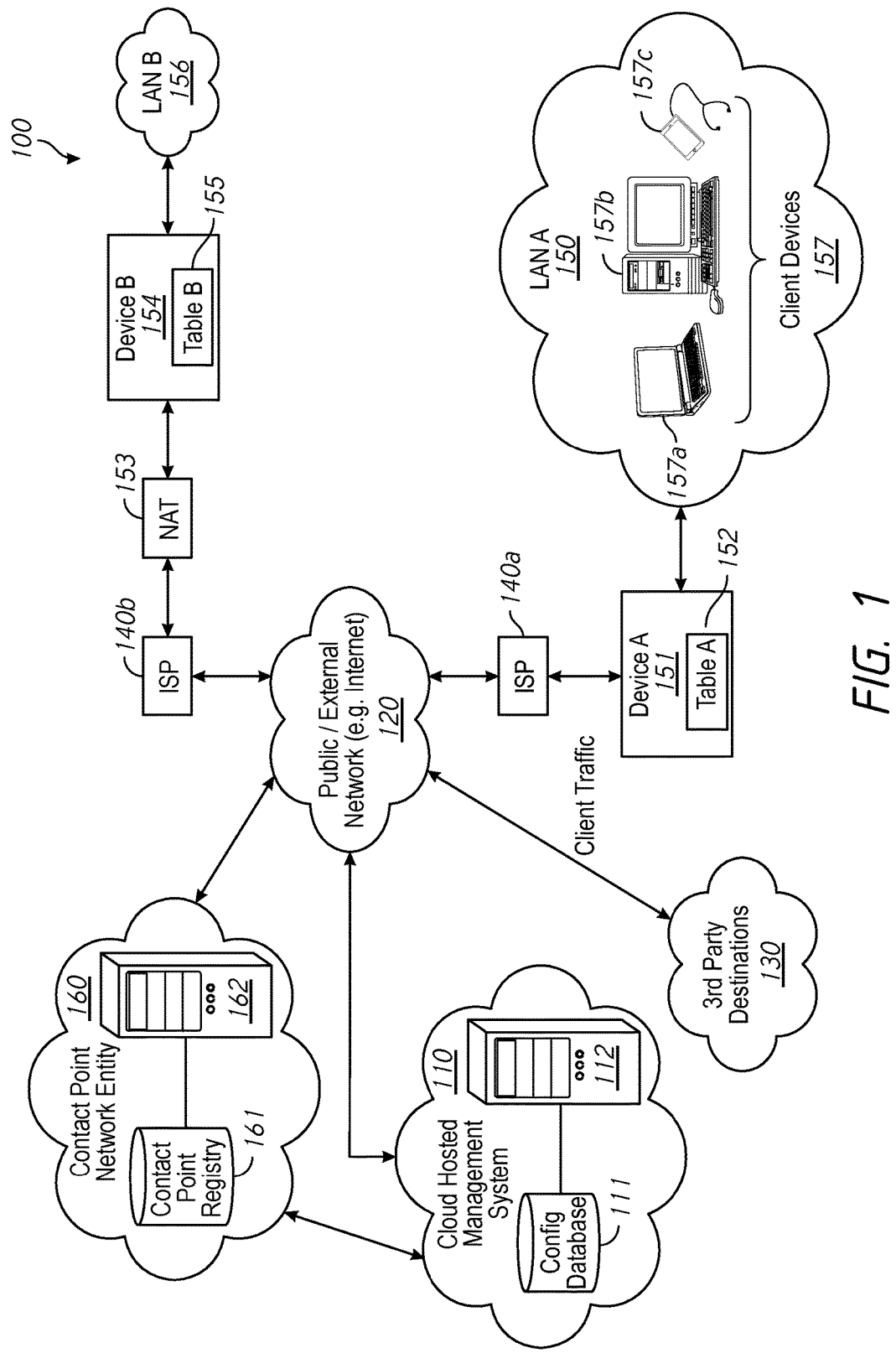
FIG. 1 is a block diagram of a networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previously available solutions to the problem of maintaining up-to-date network device addressing fail to provide systems or processes that efficiently maintain and distribute addressing information of peer networking devices. By contrast, and to that end, various implementations disclosed herein include systems, methods and apparatuses that involve a respective network device communicating requests for addressing information of its peer devices in a network, to a shared network entity of the same network. For example, in some implementations, a method includes generating a registry request message, where the registry request message includes a first portion and a second portion, where the first portion is characterized by a first write privilege and the second portion is characterized by a second write privilege different from the first write privilege. The method also includes conveying the registry request message to a shared contact point network entity, and obtaining a response message addressed from the shared contact point network entity. In various implementations, the response message includes peer contact point information corresponding to one or more peer devices associated with the network device.

Various implementations disclosed herein include systems, methods and apparatuses that share and maintain addressing information for networking devices of a given network, at a network entity. For example, in some implementations, a method includes obtaining a registry request message from a first network device, where the registry request message includes a first portion and a second portion, where the first portion is characterized by a first write privilege and the second portion is characterized by a second write privilege different from the first write privilege. The method also includes obtaining peer contact point information corresponding to one or more peer devices of the first network device, from a contact point registry, and generating a response message including the peer contact point information corresponding to one or more peer network devices of the first network device.

There are two major challenges to address with respect to enabling identification of peer network devices in private networks. First, any respective network device of the network prefers to maintain a current listing of addressing information for any other network device with which it is configured to maintain a data tunnel or some form of communication link. Second, a respective network device of the network prefers a mechanism for quickly and reliably informing its peer devices of its own updated addressing information.

FIG. 1 is a block diagram of a networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, networking environment 100 includes a public/external network 120 (e.g., a portion of the Internet), one or more third-party destinations 130, a cloud hosted network management system 110, a contact point network entity 160, an optional network address translation device (NAT) 153, optional Internet service provider (ISP) nodes 140a and 140b, network device A 151 having Table A 152 and network device B 154 having Table B 155, and local area networks LAN A 150 and LAN B 156.

Moreover, while FIG. 1 includes only two LANs (e.g., LAN A 150 and LAN B 156), those of ordinary skill in the art will appreciate that in some implementations, a private network is associated with an arbitrary number of geographically distributed and/or collocated local area networks. Similarly, while FIG. 1 illustrates two exemplary network devices (e.g., Device A 151 and Device B 154), in some implementations a private network includes more than two network devices.

In various implementations, LANs (e.g., LAN A 150 and/or LAN B 154) include additional infrastructure not shown in FIG. 1, such as a gateway node, and/or a network root node. In some implementations, LANs are associated with a number of compliant networking devices, and/or a number of non-compliant networking devices, where compliant devices are configured to communicate particular information with the cloud hosted network management system 110. For example, compliant devices are configured to share status information, configuration information and/or network traffic information with the cloud hosted network management system 110 and/or other compliant devices. In some implementations, a number of client devices 157 are operating within a respective LAN.

The one or more third-party destinations 130 provide various third-party content and services, such as email, media content, online banking, social networking servers, etc. Other than providing sources and/or destinations for client data traffic, the details of the one or more third-party destinations 130 are not particularly pertinent to the scope of the present disclosure. As such, no further details pertaining to the one or more third-party destinations 130 are provided for the sake of brevity.

FIG. 1 further illustrates that Device A 151 connects LAN A 150 to the public network 120 through an optional ISP node 140a, and in some embodiments, includes features such as a firewall. In some implementations, a network device such as Device A 151 is provided as a single entity (e.g., a router, a virtual machine, etc.). In some implementations, a network device such as Device A 151 includes a distributed system including a suitable combination of software, data structures, virtual machines, computing devices, servers, switches and routers. Merely for the sake of brevity and convenience of explanation, network devices are described herein as single entities.

In some implementations, network devices, such as Device A 151 and/or Device B 154, include routers and/or provide routing functionality. In some implementations, a network device operates in connection with other networking appliances such as NAT devices (e.g., NAT 153), while in some implementations at least some of the functionality of one or more other appliances is built into the network devices. In some embodiments, network devices are capable of filtering network traffic to and from client devices 157, and optionally performing this filtering on the basis of Layer 7 (of the OSI model) packet information. In some implementations, network devices such as Device A 151 and/or Device B 154, are used to establish private networks (e.g., virtual private networks or VPNs) between themselves. In some of these implementations, some or all network traffic from client devices 157 can be routed through a network device over a private network. For example, Device A 151 is configured to allow VPN traffic from client device 157a to go through a VPN data tunnel established with Device B 154, destined for another client device on LAN B 156. In this same example, Device A 151 may allow network traffic from client devices 157 destined for a $3^{rd}$ party destination 130 to travel over the public/external network 120.

The networking environment 100 includes a contact point network entity 160 configured to maintain, obtain and/or report addressing information for networking devices, such as Device A 151 and/or Device B 154. In some embodiments, contact point network entity 160 is a part of cloud hosted management server 110. In some implementations, contact point network entity 160 and cloud hosted management server 110 reside on a single network entity, such as a group of servers, a single server machine or portions of several servers that are not dedicated to these services.

The addressing information stored at contact point network entity 160 may take several forms. For example, such addressing information includes Internet Protocol (IP) addresses, port numbers, device identifiers, device serial numbers, user-selected device names, geographic location data, client identification (e.g., ABC Coffee Shops or client 2395), and/or device connectivity information. In some implementations, the addressing information stored at contact point network entity 160 includes private addressing information and public addressing information. For example, a network device such as Device B 154 operating behind a NAT such as NAT 153, has a public IP address and public port number that are both accessible and visible from public network 120, and a private IP address and private port number. In some implementations, a set of addressing information for a respective device is referred to as contact point information. For example, contact point network entity 160 has contact point information corresponding to Device A 151, such as a private IP address, a private port number, a public IP address, a public port number, and a device identifier.

In some embodiments, a subset of a respective network device's contact point information is referred to as public contact point information and another subset of the network device's contact point information is referred to as private contact point information. For example, the private IP address and private port number associated with Device B 154, is included in that device's private contact point information. In some implementations, a networking device only has private contact point information or public contact point information, or both sets of contact point information are the same. For example, Device A 151 is not located behind a NAT device, so it is only associated with one IP address and one port number.

Contact point network entity 160 includes a contact point registry 161 for storing contact point information of network devices, a contact point server 162, and in some implementations, a gateway device (not shown) providing access to public network 120 for contact point network entity 160. FIG. 1 illustrates that Device A 151 includes a local peer contact point table, Table A 152. In some embodiments, one or more networking devices of a private network have a local peer contact point table containing some or all of the contact point information stored at contact point registry 161. In some embodiments, a local peer contact point table has contact point information for peer network devices of a respective network device. In some embodiments, peer network devices of a respective network device are network devices with which the respective network device shares a communication path or data tunnel. For example, Table A 152 of Device A 151 has a private IP address and private port number and public IP address and public port number of Device B 154, a peer device to Device A 151.

Client devices 157 include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157*a*, workstation 157*b*, smartphone 157*c*, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

The cloud hosted network management system 110 is configured to manage the configuration and operation of compliant devices in a LAN and/or across geographically distributed portions of a VLAN. To that end, the cloud hosted network management system 110 includes a configuration database 111 for storing configuration information of compliant devices, a cloud hosted management server 112, and in some implementations, a gateway device. In some embodiments, compliant devices are configured to communicate particular information with the cloud hosted network management system 110. For example, compliant devices are configured to share status information, configuration information and/or network traffic information with the cloud hosted network management system 110 and/or other compliant devices. In some embodiments, the network devices, Device A 151 and Device B 154, of FIG. 1 are compliant devices.

In some implementations, a gateway device (not shown) connects the cloud hosted management server 112 to the public network 120 so that the cloud hosted management server 112 is able to communicate with one or more LANs and/or geographically distributed portions of a VLAN, and optionally includes features such as a firewall. In some implementations, a gateway device is provided as a single entity (e.g., a server, a virtual machine, etc.). In some implementations, a gateway device includes a distributed system including a suitable combination of software, data structures, virtual machines, computing devices, servers, switches and routers. Merely for the sake of brevity and convenience of explanation, the optional gateway device is described herein as a single entity.

FIG. 1 illustrates the use of ISP node 140*a* to link LAN A 150 to the public network 120, and the use of ISP node 140*b* to link LAN B 156 to the public network 120. In some embodiments an ISP node is not required to link a local area network to a public network. In various implementations, an ISP node is provided as a single entity (e.g., a server, a virtual machine, etc.). In some implementations, an ISP node is implemented as a distributed system including a suitable combination of software, data structures, virtual machines, computing devices, servers, switches and routers. For the sake of brevity and convenience of explanation, the ISP nodes 140*a* and 140*b* are each described herein as a single entity.

Figure 2:
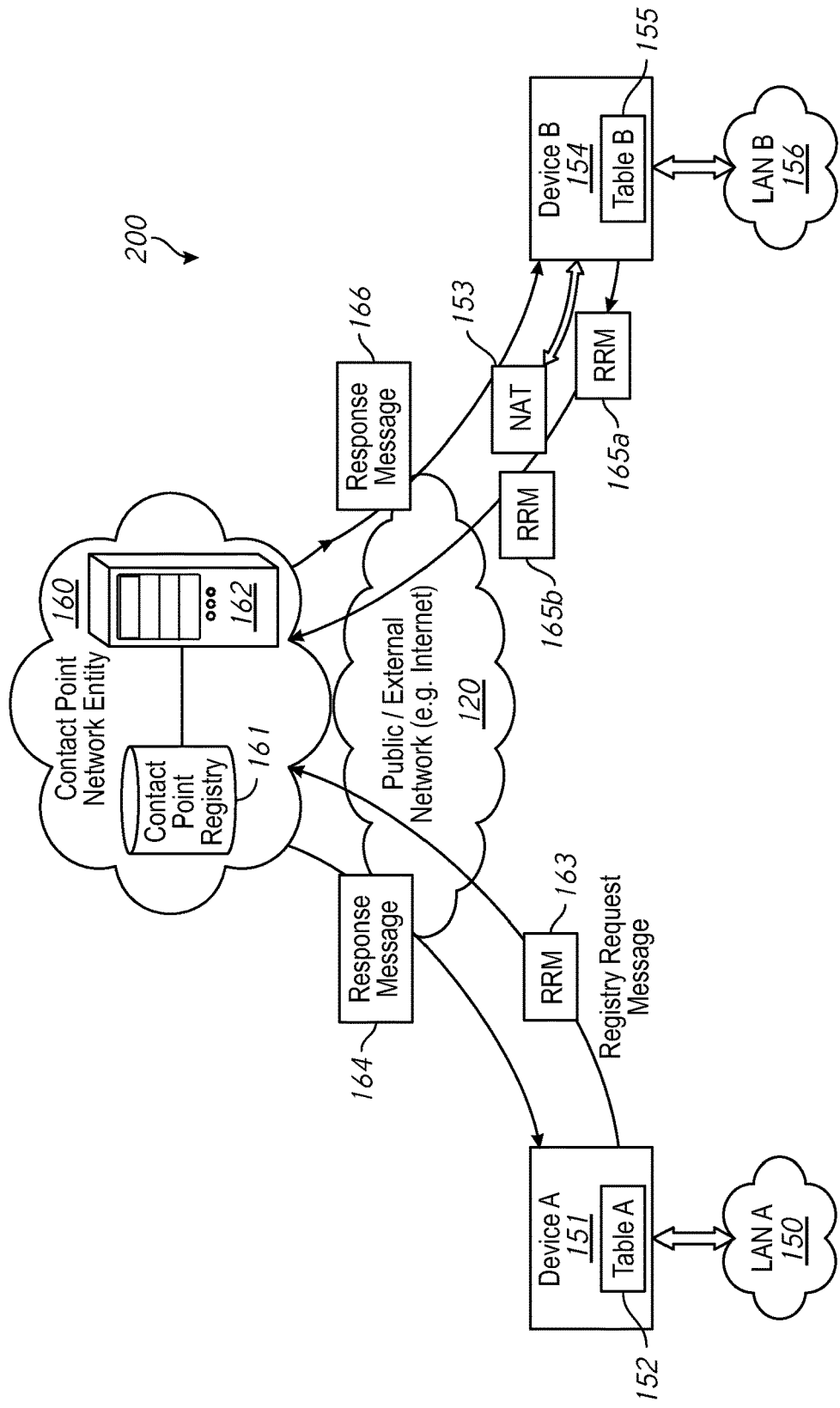
FIG. 2 is a block diagram illustrating the flow of messages among entities of a networking environment in accordance with some implementations.

FIG. 2 is a block diagram illustrating the flow of messages among entities of a networking environment 200 in accordance with some implementations. For the sake of brevity and convenience of explanation, some elements from networking environment 100, described with respect to FIG. 1, have been removed from FIG. 2, however those of ordinary skill in the art will appreciate that in some implementations these elements exist in networking environment 200, and function as described earlier. Networking environment 200 illustrates two exemplary network devices, Device A 151 and Device B 154, communicating with the contact point network entity 160. In some embodiments, a network device is in direct communication with contact point network entity 160, as exhibited by Device A 151, while in some embodiments, a network device has a NAT device (e.g., NAT 153) in the path of communication with contact point network entity 160, as is the case for Device B 154, in FIG. 2. In some implementations a NAT device provides a firewall for network traffic going to or from a network device.

In the example shown in FIG. 2, both network devices, Device A 151 and Device B 154, generate communications called registry request messages (RRM). For example, Device A 151 generated RRM 163 and Device B generated RRM 165*a*. In some implementations a respective network device transmits registry request messages to the contact point network entity 160. For example, transmission of a registry request message is also referred to as a "push" activity by the network device. In some implementations registry request messages are retrieved from network devices, by contact point network entity 160. For example, retrieval of a registry request message is also referred to as a "pull" activity by contact point network entity 160. Regardless of the particular mechanism, in various implementations a registry request message corresponding to a particular network device arrives at the contact point network entity 160 on a periodic basis (e.g., every 10 seconds). The frequency with which these registry request messages are received may be analyzed by contact point network entity 160. For example, a longer than average receipt time may indicate a problem at the network device, or with the communication path to the network device. A lack of receipt may be used by contact point network entity 160 to detect that a network device is offline.

In some implementations, a registry request message includes two or more portions, where each respective portion of the registry request message has a different read and/or write privilege. For example, the first portion of the registry request message can be deleted, added to or modified, while the second portion has a read/write privilege of read-only. In some implementations, a network device writes its own contact point information to one or more portions of the registry request message as part of the generation of the message.

FIG. 2 also illustrates an example of how a NAT device such as NAT 153, intercepts registry request messages traveling from a network device to contact point network entity 160. For example, Device B generates registry request message RRM 165*a*, which is intercepted by NAT 153 en route to contact point network entity 160. In this same example, RRM 165*b* represents the same registry request message generated by Device B 154, after passing through NAT 153. In some implementations a NAT intercepts and modifies at least a portion of a registry request message, creating a modified registry request message for contact point network entity 160. For example, a registry request message such as RRM 165*a* has a header portion and a payload portion (e.g., a first portion and a second portion), and NAT 153 rewrites or adds addressing information to the header of the registry request message RRM 165*a*. In some embodiments, a NAT device provides the public contact point information, such as public IP address and public port number, used to access a respective network device. In some implementations, the NAT device writes this public contact point information to a portion of a registry request message passing through it.

In some implementations, a registry request message selectively includes one or more additional components. For example, one such component is contact point information of the network device that generated the registry request message. Another example of an additional component is a request for contact point information of one or more peer devices of the network device that generated the registry request message. In some implementations a request for contact point information includes device identifiers for the one or more peer devices. In some implementations, a respective network device acquires these device identifiers when it receives configuration information from an external source such as cloud hosted management system 110 (FIG. 1). In some implementations a respective network device (e.g., Device A 151) receives configuration information on a periodic basis, or when a change in configuration is performed. In some of these implementations, the contents of the local peer contact point information table (e.g., Table A 152) are modified to add entries for new peer devices or delete entries for removed peer devices.

Contact point network entity 160, is shown to have generated response messages, namely response message 164 to Device A 151 and response message 166 to Device B 154. In some implementations, a respective response message corresponds to a respective registry request message. For example, response message 164 en route to Device A 151, is generated by contact point network entity 160 in response to receiving registry request message 163. In some embodiments, a response message includes requested contact point information for peer devices of the requesting network device. As shown in FIG. 2, a response message such as response message 166, still passes through a NAT device such as NAT 153, located between contact point network entity 160 and a respective network device such as Device B 154. In some implementations, a NAT device modifies a response message passing through to a network device. For example, NAT 153 writes its own IP address and port number (e.g., a public IP address and public port number) to a portion of response message 166 that has write privileges, so that Device B 154 can determine that it is located behind NAT 153 by reading the modified response message.

FIG. 3A is a table 300 representing exemplary contents of a contact point registry in accordance with some implementations. Table 300 includes columns 302, 304, 306, 308, and 310, and entries 312, 314, 316 and 318. Within table 300, column 302 stores one or more device identifiers for each respective network device. In this example distinct alphanumeric characters are used to identify respective network devices, but those of ordinary skill in the art will appreciate that this is not a limiting example of unique identifiers of network devices of a given network (or private network). In some implementations, more than one identifier is stored for a respective network device (e.g., a user-selected name and a unique system-generated number). In some implementations, a network device has an identifier that is unique amongst all compliant network devices in existence, even beyond the given network.

Column 304 provides an example of how private contact point information can be stored. In some implementations, private contact point information associated with a respective network device includes a pair of a private IP address and a private port number. For example, the private contact point information of the network device of entry 312, identified as Device A, includes the private IP address 10.0.10.0 and private port number of 50234. Column 306 illustrates an example of stored public contact point information. In some embodiments, public contact point information associated with a respective network device includes a pair of a public IP address and a public port number. In some implementations, the private contact point information and public contact point information for a respective device are the same. For example, Device A in entry 312 has the same IP address and port number for both since there is no intermediate NAT device between Device A and the contact point network entity, as shown in FIG. 1.

In some implementations, the contact point registry has a column 308 for storing the peer devices of a respective network device. For example, in entry 316, associated with Device C, it is shown that Device A and Device D are peers of Device C. In some implementations, the peer devices of a respective network device are determined from one or more received registry request messages from the respective network device. In some implementations, information such as the information shown in column 310 is included in the contact point registry, to indicate the nature of a respective device in a particular network topology. For example, the network that includes Device A, Device B, Device C and Device D, has a hub and spoke topology, where one or more network devices is a "hub" device typically connected to at least two other network devices, and one or more network devices is a "spoke" device typically only connected to one other network device. Alternative topologies may be implemented for a given network, and as such, the contact point registry may include information for each respective network device, for those alternative topologies. The columns and information shown in FIG. 3A are merely examples of the type of information found in a contact point registry, but those of ordinary skill in the art will appreciate that in some implementations, the contact point registry includes additional information (e.g., status information, or time since last registry request message received), or less information than shown.

FIG. 3B is an example of a local peer contact point table 350 in accordance with some implementations. Table 350 includes columns 320, 322, 324 and 326, and entries 328 and 330. For example, local peer contact point table 350 is stored at Device A 151, in FIG. 1. In some implementations, table 350 includes a subset of the information in the contact point registry, while in some implementations table 350 includes additional information (e.g., status column 326). The example in FIG. 3B shows that Device A has two peer devices, Device B and Device C, represented by entry 328 and entry 330, respectively. In this example, peer device private contact point information 322 is stored for each peer device, including a private IP address and private port number for each respective peer. Additionally, peer device public contact point information 324 is stored, and in this case that includes storing a public IP address and public port number for each respective peer. Table 350 also includes a status column 326, to store an indicator of whether or not a respective peer network device is online or offline.

Figure 4:
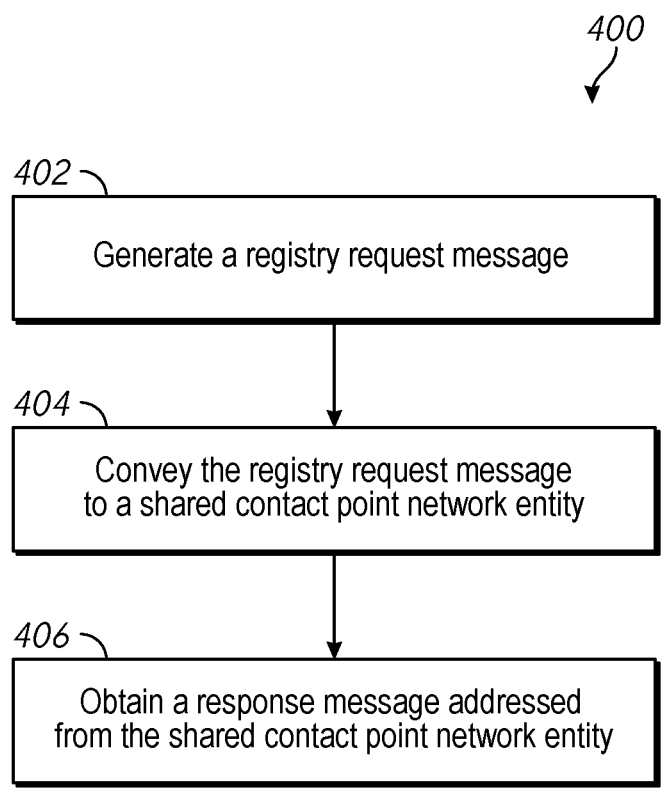
FIG. 4 is a flowchart representation of a method of communicating a registry request message from a first network device in accordance with some implementations.

FIG. 4 is a flowchart representation of a method 400 of communicating a registry request message from a network device in accordance with some implementations. For the sake of additional clarity and detail, the method 400 is described with reference to FIG. 1, FIG. 2 and FIGS. 3A and 3B. In some implementations, method 400 is performed at a network device, such as Device A 151 or Device B 154 in FIG. 1. In some implementations, method 400 is performed at a device operating as a router and/or as a gateway node. In some implementations, method 400 is performed by one or more devices in communication with each other through a private network, such as a VPN.

Method 400 includes a network device generating (402) a registry request message. For example, as described above with respect to FIG. 2, Device A 151 generated registry request message 163. In some embodiments, a registry request message has a first portion and a second portion of the message, such as a header and a payload. In some implementations, the first portion is characterized as having a first read and/or write privilege, and the second portion is characterized as having a second read and/or write privilege. For example, the first portion of the registry request message has a read and/or write privilege that permits information to be deleted, supplemented and/or modified, while the second portion of the registry request message has a read and/or write privilege of read-only, preventing information from being supplemented, deleted or modified. However, in some implementations the first portion and the second portion of the registry request message have the same read and/or write privileges. In some implementations, generating the registry request message includes the network device writing its own IP address, port number and/or any other addressing information to one or more portions of the registry request message.

In some embodiments, the contents of one or more portions of the registry request message are modified as the message travels through a network. For example, as described above with respect to FIG. 2, a registry request message 165a is shown before it goes through a network address translation (NAT) device 153, and registry request message 165b is shown after it has passed through NAT 153. In this example, NAT 153 modified the header (e.g., first portion) of the registry request message, but left the payload (e.g., second portion) intact. In some implementations, a registry request message is modified so that a first portion of the message has new addressing or contact point information, compared to having unmodified/original addressing or contact point information. For example, referring back to FIG. 2, a first portion of registry request message 165a originally included private contact point information corresponding to Device B 154, or no addressing information at all. In this example, NAT 153 modified the contents of the first portion of registry request message 165a, so that the first portion of registry request message 165b contains public contact point information corresponding to Device B 154. In some implementations, the new addressing or contact point information in the first portion of a modified registry request message is considered public contact point information for the corresponding network device, and contact point information in the payload of the registry request message is considered private contact point information for the network device.

Method 400 includes the network device conveying (404) the first registry request message to a shared contact point network entity. For example, as shown in FIG. 2, Device A 151 generated registry request message 163, and either allowed the message to be retrieved (e.g., "pulled") by contact point network entity 160, or transmitted (e.g., "pushed") it to contact point network entity 160. As described above, the contact point network entity 160 resides on a single computing machine, several computing machines such as servers, or on portions of several computing machines along with other network entities, depending on the implementation. The contact point network entity is shared among the network devices of a given network, and in some implementations it is shared among network devices of several networks. For example, one contact point network entity supports the addressing information of several corporations' private networks.

FIG. 4 shows that method 400 continues with the network device obtaining (406) a response message addressed from the shared contact point network entity. For example, FIG. 2 shows Device A 151 obtaining response message 164 from contact point network entity 160. In some implementations, this obtaining of the response message is performed as an active retrieval (e.g., "pull") action by the network device, and in some implementations it is performed as an active transmission (e.g., "push") action by the shared contact point network entity. In some implementations, the response message corresponds to a particular registry request message, and contains specific information requested by the network device in the corresponding registry request message. For example, in FIG. 2, Device A 151 requested peer contact point information for its peer devices, Device B and Device C, in registry request message 163. In this example, after contact point network entity 160 received and interpreted the request, it returned response message 164 to Device A 151. In some implementations, a response message is obtained in response to conveying a registry request message to the shared contact point network entity.

In some implementations, the network device reads the response message to obtain peer contact point information of its peers, but also to obtain contact point information pertaining to itself. For example, as shown in FIG. 2, Device B 154 is situated behind NAT device 153, which writes a public IP address and public port number to a portion of response message 166 before it reaches Device B 154. In this example, Device B 154 reads modified response message 166 to learn the public IP address and public port number assigned to Device B 154, and stores this information in Table B 155 or another location in local storage.

Figure 5:
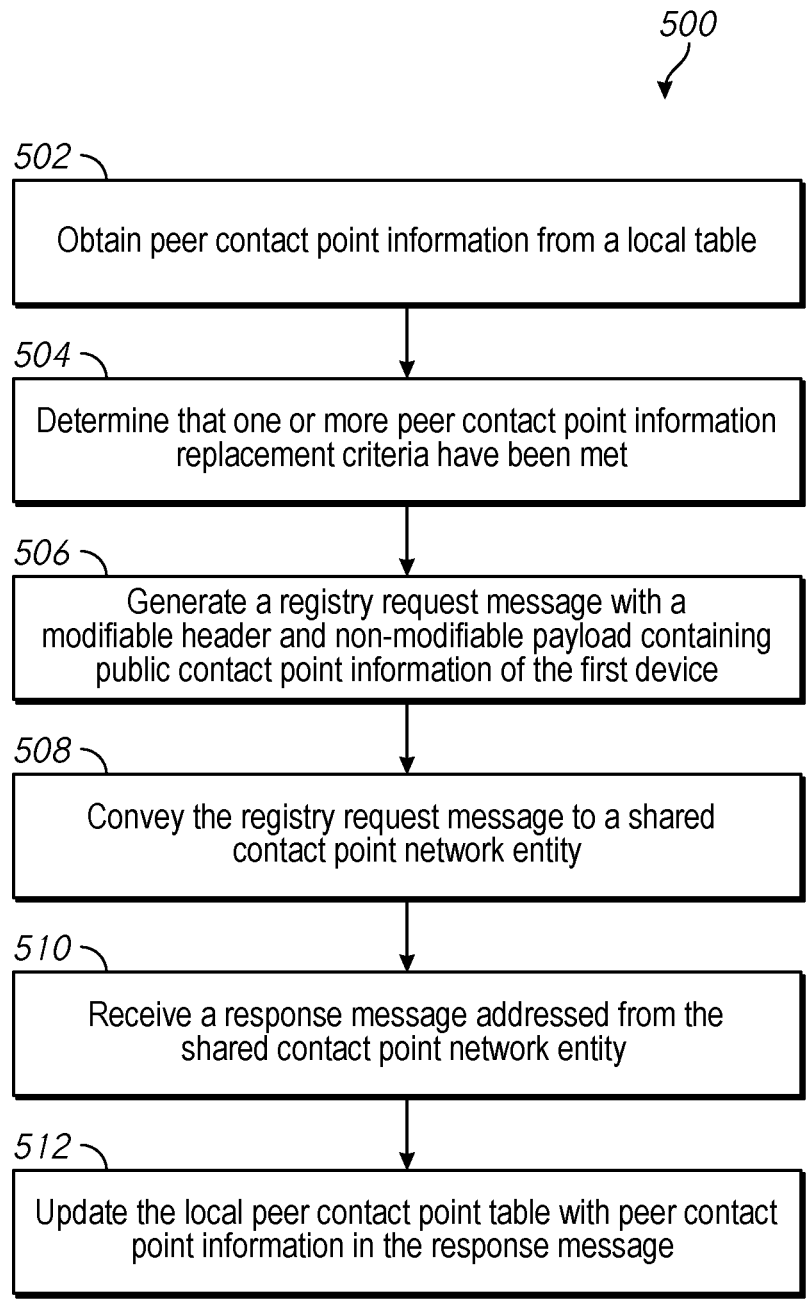
FIG. 5 is a flowchart representation of a method of updating locally-stored contact point information at a first network device in accordance with some implementations.

FIG. 5 is a flowchart representation of a method 500 of updating locally-stored contact point information at a first device in accordance with some implementations. In some implementations, method 500 is an extension or a more detailed process for performing some or all of the activities of method 400 described earlier. As such, for the sake of efficiency reference is made, when appropriate, to corresponding activities in method 400. For the sake of additional clarity and detail, the method 500 is described with reference to FIG. 1, FIG. 2 and FIGS. 3A and 3B. In some implementations, method 500 is performed at a network device, such as Device A 151 or Device B 154, in FIG. 1. In some implementations, method 500 is performed at a device operating as a router and/or as a gateway node. In some implementations, method 500 is performed by one or more devices in communication with each other through a private network, such as a VPN.

Method 500 includes a network device obtaining (502) peer contact point information from a local table. For example, with reference to FIG. 2, Device A 151 obtains (e.g., retrieves) contact point information for its peer devices, Device B 154 and Device C (not shown), from local peer contact point table, Table A 152. In some implementations, there is no contact point information in the local peer contact point table, such as when the network device first joins a given network, or reboots.

Furthermore, the method includes the network device determining (504) that one or more peer contact point information replacement criteria for one or more peer devices have been met. In some implementations this determination is made by comparing a parameter corresponding to how long it has been since the contact point information for a particular peer device was updated, to a predefined threshold (e.g., 10 seconds). For example, Device A retrieves contact point information for Device C, and a parameter indicating that Device C's contact point information has not been updated for 12 seconds. In this example, Device A compares the parameter to a predefined threshold of 10 seconds, and determines that one criterion for replacing or updating the peer contact point information for Device C, has been met.

In some implementations, the process of updating the peer contact point information for peer devices of a network device is synchronized for all the peer devices. For example, Device A determines that both of its peer devices, Device B and Device C have contact point information that has been updated 15 seconds ago, longer than is allowed by the predefined threshold of 10 seconds. In some implementations, the parameter indicating how long ago the peer contact point information for a respective peer device was updated, is stored in the local peer contact point table of a network device (e.g., Table A 152 of Device A 151, FIG. 1). In some implementations, a network device checks these parameters on a periodic basis (e.g., every second) to determine if one or more peer device contact point information replacement criteria have been met.

As described above with respect to method 400, the network device generates (506) a registry request message with a modifiable header and non-modifiable payload containing public and/or private contact point information of the first device, and conveys (508) the registry request message to a shared contact point network entity.

Method 500 includes receiving (510) a response message at the network device, addressed from the shared contact point network entity. In some implementations the response message is received directly from the shared contact point network entity, while in some implementations the response message passes through a NAT device before reaching the network device. The method 500 includes updating (512) the local peer contact point table with peer contact point information in the response message. For example, FIG. 3B shows the contents of a local peer contact point table 350 for Device A 151 (in FIG. 1), after it has been updated with contact point information corresponding to Device A's peer devices, Device B and Device C. In some implementations, method 500 continues with generating and conveying a second registry request message to the shared contact point network entity, and receiving a second response message from the shared contact point network entity.

Figure 6:
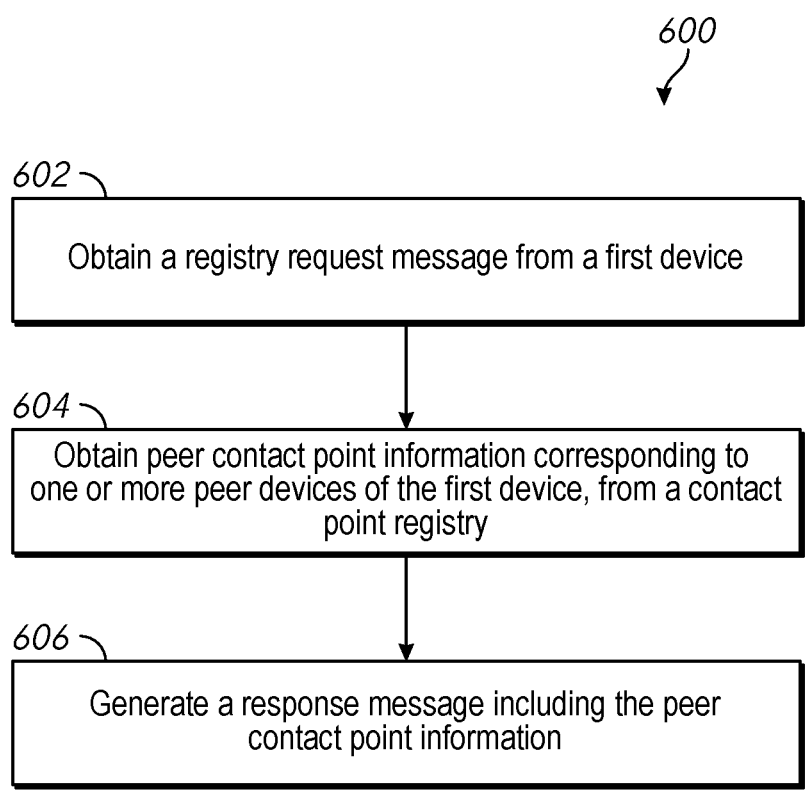
FIG. 6 is a flowchart representation of a method of retrieving contact point information at a contact point network entity in accordance with some implementations.

FIG. 6 is a flowchart representation of a method 600 of retrieving contact point information performed at a contact point network entity in accordance with some implementations. For the sake of additional clarity and detail, the method 600 is described with reference to FIG. 1, FIG. 2 and FIGS. 3A and 3B. In some implementations, method 600 is performed at a network entity or server, such as contact point network entity 160, in FIG. 1. In some implementations, method 600 is performed at a single computing machine, or across several computing machines (e.g., a group of servers). In some implementations, method 600 is performed by one or more computing machines associated with devices in communication with each other through a private network, such as a VPN.

Method 600 includes obtaining (602) a registry request message from a first network device. For example, FIG. 2 shows contact point network entity 160 obtaining registry request message 163 from Device A 151. In this example, registry request message 163 is either transmitted by Device A 151 (e.g., "pushed"), or retrieved by contact point network entity 160 (e.g., "pulled"). The contact point network entity obtains (604) peer contact point information corresponding to one or more peer devices of the first device, from a contact point registry. In some implementations, this peer contact point information is obtained in response to receiving the registry request message. For example, in FIG. 2, contact point network entity 160 receives registry request message 163 from Device A 151, and subsequently obtains contact point information for Device A's 151 peers, Device B 154 and Device C (not shown), from contact point registry 161.

In some implementations, obtaining the peer contact point information includes detecting which network device generated the received registry request message and retrieving a list of that network device's peers. For example, contact point network entity 160 determines that message 163 came from Device A 151, and that Device B 154 and Device C are peer devices to Device A. In some implementations, obtaining the peer contact point information includes reading the content of the received registry request message to determine the peer devices of the network device that generated the registry request message. For example, contact point network entity 160 reads a registry request message generated by Device A 151 to retrieve Device B 154 and Device C's contact point information.

Method 600 continues with generating (606) a response message including the obtained peer contact point information. In some implementations, generating the response message includes writing additional information such as the status of a network device's peer devices (e.g., offline, online), the contact point information on record for the network device that generated the registry request message, and/or changes in network topology (e.g., a peer device going from a hub to a spoke). In some implementations, method 600 continues with obtaining a second registry request message, optionally from a second network device.

Figure 7:
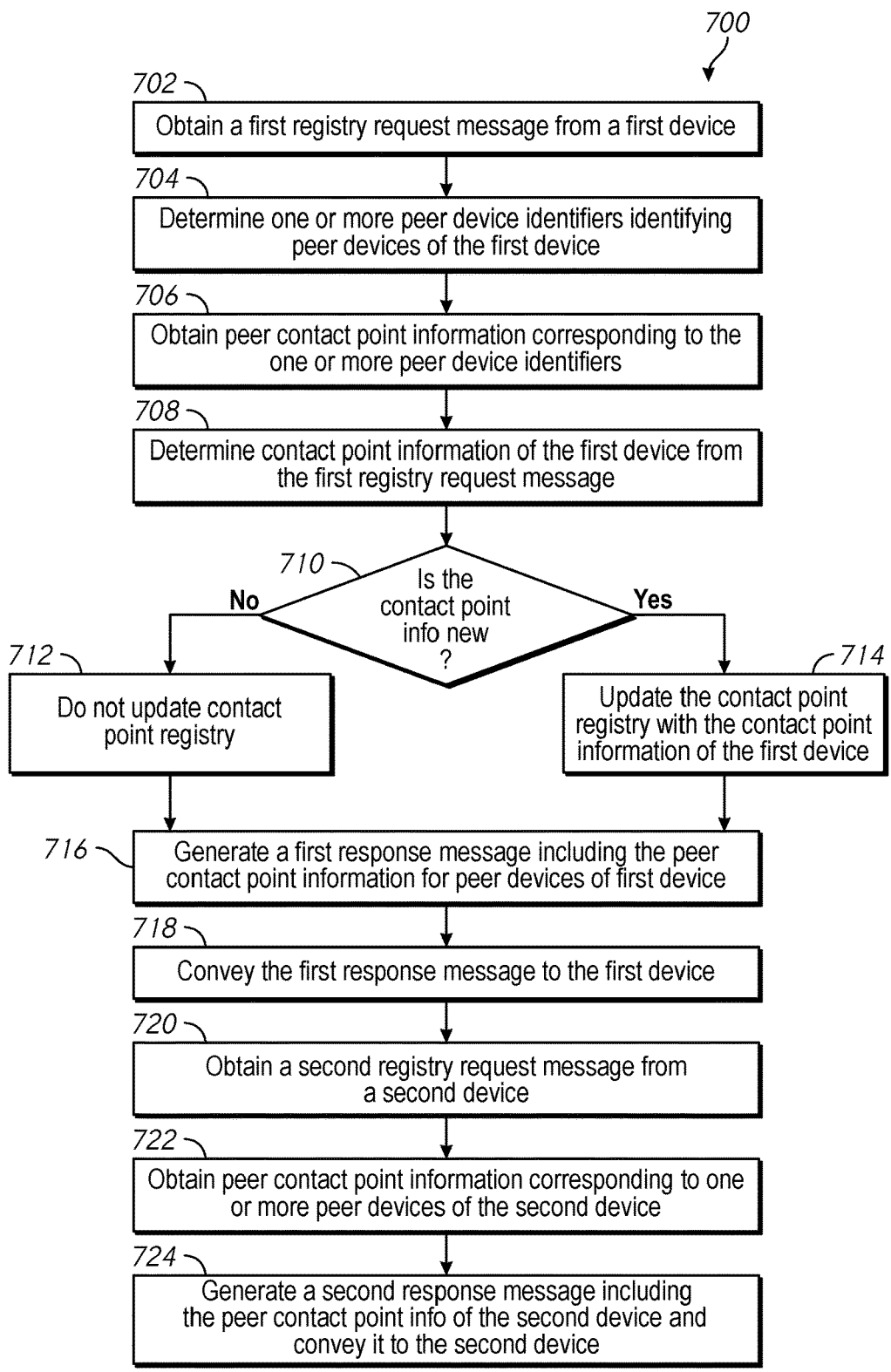
FIG. 7 is a flowchart representation of a method of contact point information retrieval at a contact point network entity in accordance with some implementations.

FIG. 7 is a flowchart representation of a method 700 of contact point information retrieval at a contact point network entity in accordance with some implementations. In some implementations, method 700 is an extension or a more detailed process for performing some or all of the activities of method 600 described earlier. As such, for the sake of efficiency, reference is made, when appropriate, to corresponding activities in method 600. For the sake of additional clarity and detail, the method 700 is described with reference to FIG. 1, FIG. 2 and FIGS. 3A and 3B. In some implementations, method 700 is performed at a network entity or server, such as contact point network entity 160, in FIG. 1. In some implementations, method 700 is performed at a single computing machine, or across several computing machines such as a group of servers. In some implementations, method 700 is performed by one or more computing machines associated with devices in communication with each other through a private network, such as a VPN.

Method 700 includes obtaining (702) a first registry request message from a first network device, as described above with respect to method 600, and determining (704) one or more peer device identifiers identifying peer devices of the first network device. In some implementations, determining the one or more peer device identifiers includes reading and retrieving the peer device identifiers from the registry request message generated by the first network device. For example, in FIG. 2, contact point network entity 160 reads identifier B corresponding to Device B 154, and identifier C corresponding to Device C, (not shown) the two peer devices of Device A 151. In some implementations, determining the one or more peer device identifiers includes retrieving the peer device identifiers from a table indexed by network devices. For example, contact point network entity 160 retrieves peer device identifiers B and C from a table, using Device A as the search basis.

In some implementations, the first network device initially obtains peer device identifiers corresponding to its peer network devices through the receipt of configuration information. For example, as described with respect to FIG. 1, configuration information is received from the cloud hosted management system 110. In this example, the topology of the entire network is established using the cloud hosted management system 110, which defines which network devices are peer devices to the first network device. In some implementations, the cloud hosted management system 110 does not know or maintain contact point information for the various network devices of a given network, but it does know and maintain the device identifiers for each respective network device of networking environment 100. The method 700 includes obtaining (706) peer contact point information corresponding to the one or more determined peer device identifiers from the first registry request message, as described earlier with respect to method 600.

The contact point network entity determines (708) contact point information of the first network device from the first registry request message. For example, as described with respect to FIG. 2, in some implementations, a registry request message includes two or more portions, where each respective portion of the registry request message has a different read and/or write privilege. In this example, the private contact point information of the first network device is written to one portion of the registry request message and the public contact point information is written to another portion. In some implementations, determining the contact point information of the first network device includes reading the first registry request message, identifying a device identifier corresponding to the first network device, and correlating contact point information in the first registry message associated with the device identifier for the first network device.

Method 700 includes deciding (710) whether or not the determined contact point information of the first network device (e.g., from the first registry request message) is different from contact point information corresponding to the first network device, stored in the contact point registry of the contact point network entity. In some implementations, the contact point registry does not contain any contact point information corresponding to the first device, and as such, the determined contact point information is considered to be different. In accordance with a determination that the contact point information associated with the first network device in the first registry request message is not different, the contact point network entity does not update (712) the contact point registry. In accordance with a determination that the contact point information associated with the first network device in the first registry request message is different, the contact point network entity updates (714) the contact point registry.

As described earlier with respect to method 600, the contact point network entity generates (716) a first response message including the peer contact point information for the peer devices of the first network device. Method 700 also includes conveying (718) the first response message to the first network device. As described in detail earlier, in some implementations this includes either transmission of the first response message by the contact point network entity, or retrieval by the first network device.

In some implementations, method 700 additionally includes obtaining (720) a second registry request message from a second network device, in a similar manner to obtaining the first registry request message from the first network device. Although shown in exemplary method 700 to occur after obtaining the first registry request message from the first network device, those of ordinary skill in the art will appreciate that in some implementations, the second registry request message is obtained earlier or at the same time. The contact point network entity similarly obtains (722) peer contact point information corresponding to one or more peer devices of the second device, and generates (724) a second response message including the peer contact point information of the second device and conveys the second response message to the second network device.

Figure 8:
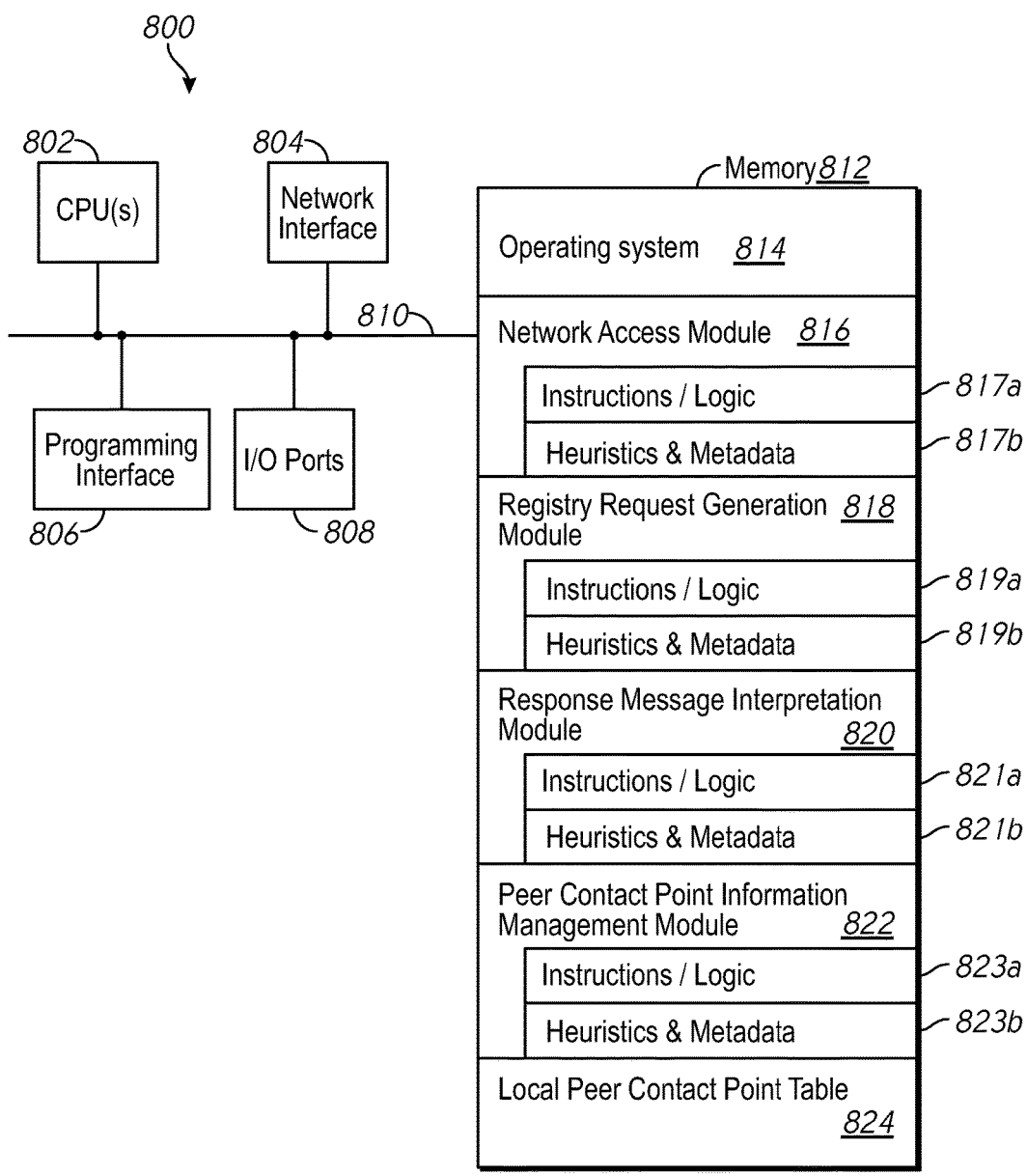
FIG. 8 is a block diagram of an exemplary network device of a networking environment in accordance with some implementations.

FIG. 8 is a block diagram of an exemplary network device 800 of a networking environment in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network device 800 includes one or more processing units (CPU's) 802, a network interface 804, a programming interface 806, one or more I/O ports 808, a memory 812, and one or more communication buses 810 for interconnecting these and various other components.

In some implementations, the communication buses 810 include circuitry that interconnects and controls communications between system components. The memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 812 optionally includes one or more storage devices remotely located from the CPU(s) 802. The memory 812 comprises a non-transitory computer readable storage medium. In some implementations, the memory 812 or the non-transitory computer readable storage medium of the memory 812 stores the following programs, modules and data structures, or a subset thereof including an optional operating system 814, a network access module 816, a registry request generation module 818, a response message interpretation module 820, a peer contact point information management module 822 and local peer contact point table 824.

The operating system 814 includes procedures for handling various basic system services and for performing hardware dependent tasks. In some implementations, network access module 816 is configured to allow the network device 800 to transmit and receive communications (e.g., to transmit registry request messages and/or receive response messages). To that end, in various implementations, the network access module 816 includes instructions and/or logic 817a, heuristics and metadata 817b.

In some implementations, registry request generation module 818 is configured to generate a registry request message. In some implementations this includes being configured to read the local peer contact point table 824, and determine for which, if any, peer devices to request contact point information in a registry request message. The registry request generation module is optionally also configured to retrieve and write the contact point information of network device 800 to the registry request message. To that end, in various implementations, the registry request generation module 818 includes instructions and/or logic 819a, heuristics and metadata 819b.

In some implementations, response message interpretation module 820 is configured to interpret a received response message from a contact point network entity, and to determine the relevant information from the response message. For example, response message interpretation module 820 reads a received response message, identifies one or more peer device identifiers and contact point information corresponding to the one or more peer device identifiers. To that end, in various implementations, the response message interpretation module 820 includes instructions and/or logic 821a, heuristics and metadata 821b.

In some implementations, peer contact point information management module 822 is configured to perform various management operations on local peer contact point table 824. For example, peer contact point information management module 822 stores, updates, retrieves and/or backs up information in local peer contact point table 824. To that end, in various implementations, the peer contact point information management module 822 includes instructions and/or logic 823a, heuristics and metadata 823b.

In some implementations, local peer contact point table 824 stores contact point information for one or more peer network devices of network device 800 (e.g., network devices with a direct communication path or data tunnel to network device 800). In some implementations, local peer contact point table 824 also stores the contact point information corresponding to network device 800. In some implementations, local peer contact point table 824 stores additional information pertaining to network device 800 and/or one or more of its peer devices, such as online status, hub/spoke/mesh topology configuration and corresponding LAN information.

Figure 9:
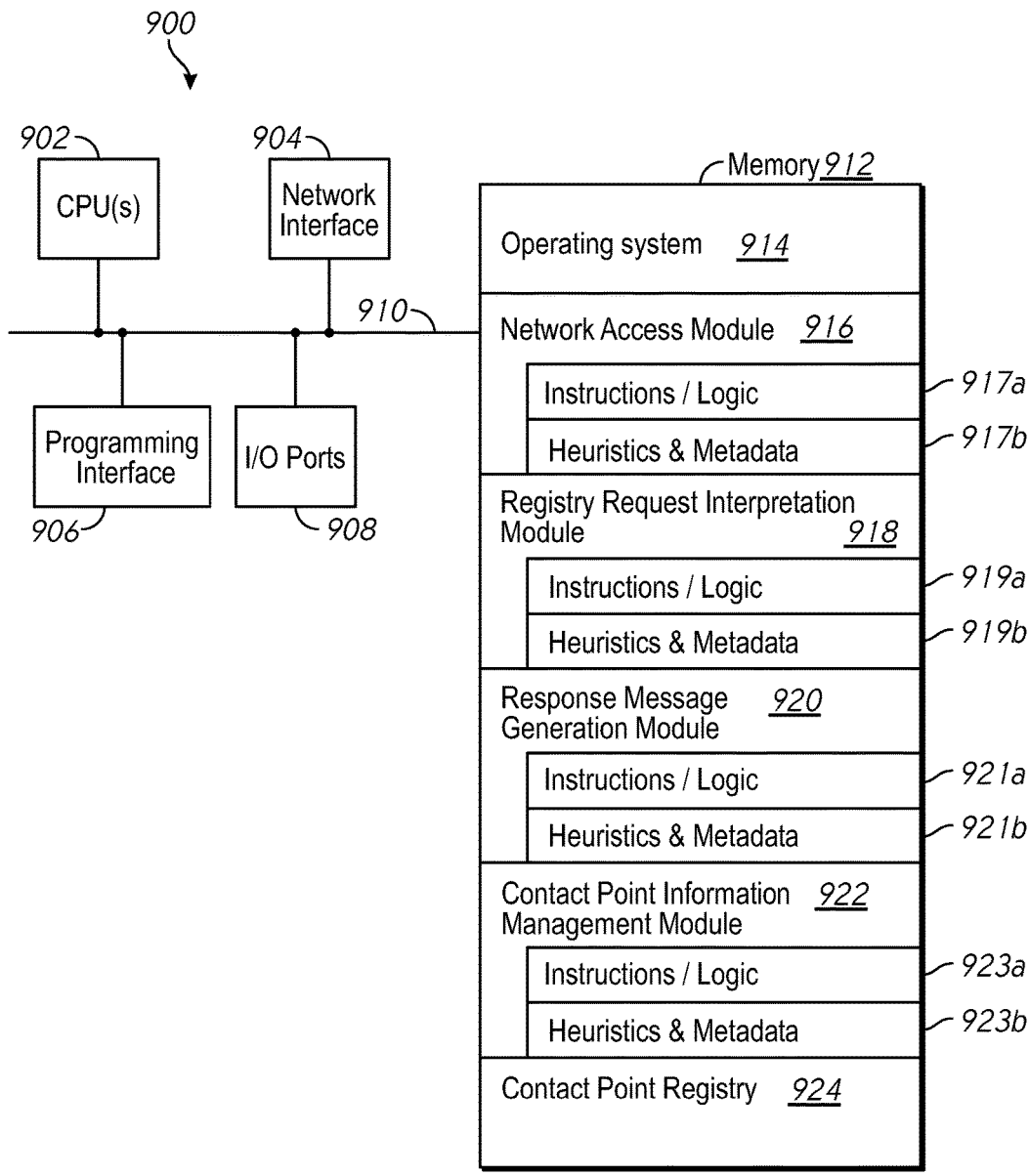
FIG. 9 is a block diagram of an exemplary contact point network entity of a networking environment in accordance with some implementations.

FIG. 9 is a block diagram of an exemplary contact point network entity 900 of a networking environment in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the contact point network entity 900 includes one or more processing units (CPU's) 902, a network interface 904, a programming interface 906, one or more I/O ports 908, a memory 912, and one or more communication buses 910 for interconnecting these and various other components.

In some implementations, the communication buses 910 include circuitry that interconnects and controls communications between system components. The memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 912 optionally includes one or more storage devices remotely located from the CPU(s) 902. The memory 912 comprises a non-transitory computer readable storage medium. In some implementations, the memory 912 or the non-transitory computer readable storage medium of the memory 912 stores the following programs, modules and data structures, or a subset thereof including an optional operating system 914, a network access module 916, a registry request interpretation module 918, a response message generation module 920, a contact point information management module 922 and a contact point registry 924.

The operating system 914 includes procedures for handling various basic system services and for performing hardware dependent tasks. In some implementations, network access module 916 is configured to allow the contact point network entity 900 to transmit and receive communications (e.g., to receive registry request messages and/or transmit response messages). To that end, in various implementations, the network access module 916 includes instructions and/or logic 917a, heuristics and metadata 917b.

In some implementations, registry request interpretation module 918 is configured to interpret a received registry request message from a network device, and to determine the relevant information from the registry request message. For example, registry request interpretation module 918 reads a received registry request message, identifies one or more peer device identifiers and requests for contact point information corresponding to the one or more peer device identifiers. In another example, registry request interpretation module 918 reads a received registry request message and determines contact point information corresponding to the network device associated with the received registry request message (e.g., a device identifier, public IP address, and private IP address). To that end, in various implementations, the registry request interpretation module 918 includes instructions and/or logic 919a, heuristics and metadata 919b.

In some implementations, response message generation module 920 is configured to generate a response message. In some implementations this includes configuring the response message generation module 920 to retrieve contact point information of the identified peer devices in the registry request message from contact point registry 924, and writing it to the response message. To that end, in various implementations, the response message generation module 920 includes instructions and/or logic 921a, heuristics and metadata 921b.

In some implementations, contact point information management module 922 is configured to perform various management operations on contact point registry 924. For example, contact point information management module 922 stores, updates, retrieves and backs up information in contact point registry 924. To that end, in various implementations, the contact point information management module 920 includes instructions and/or logic 923*a*, heuristics and metadata 923*b*.

In some implementations, contact point registry 924 stores contact point information for one or more network devices of a given network, or of several networks. In some implementations, contact point registry 924 has one or more discussed properties of contact point registry 161. In some implementations, contact point registry 924 stores additional information pertaining to the network devices of a given network, such as peer device association, online status, hub/spoke/mesh topology configuration and corresponding LAN information.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
at a first device including a memory, a non-transitory computer readable storage medium, one or more processors and one or more communication ports:
generating a first registry request message, wherein the first registry request message includes a first portion and a second portion, and wherein the first portion is characterized by a first write privilege for the first registry request message and the second portion is characterized by a second write privilege for the first registry request message, wherein the second write privilege is different from the first write privilege;
conveying, from the first device, the first registry request message to a shared contact point network entity through a second device, wherein the second device is permitted to modify the first registry request message according to the first write privilege and the second write privilege; and
obtaining a first response message addressed from the shared contact point network entity, wherein the first response message includes peer contact point information corresponding to one or more peer devices associated with the first device.

2. The method of claim 1, wherein the first write privilege permits the first portion to be overwritten by the second device, and the second write privilege restricts the second portion from being overwritten by the second device.

3. The method of claim 1, wherein the first portion includes a header and the second portion includes a payload of the first registry request message, and the header includes public contact point information corresponding to the first device, and the payload includes private contact point information corresponding to the first device.

4. The method of claim 3, wherein generating the first registry request message includes writing an internet protocol (IP) address and a port number corresponding to the first device, to both the header and the payload of the first registry request message.

5. The method of claim 1, further comprising:
generating a second registry request message;
conveying the second registry request message to the shared contact point network entity; and
obtaining a second response message addressed from the shared contact point network entity.

6. The method of claim 1, further comprising:
updating a local peer contact point table with the peer contact point information corresponding to one or more peer devices associated with the first device, received in the first response message.

7. The method of claim 1, wherein the first registry request message includes one or more peer device identifiers identifying the one or more peer devices associated with the first device.

8. The method of claim 1, wherein the peer contact point information includes public contact point information and private contact point information for each peer device of the one or more peer devices.

9. The method of claim 1, wherein the second device is permitted to modify a portion of the first response message.

10. A device comprising:
one or more processors; and
a non-transitory memory including instructions, which, when executed by the one or more processors, cause the device to:
convey, from the device, a registry request message to a shared contact point network entity, through a second device and obtain a response message addressed from the shared contact point network entity through the second device; and
generate a registry request message, wherein the registry request message includes a first portion and a second portion, and wherein the first portion is characterized by a first write privilege for the registry request message and the second portion is characterized by a second write privilege for the registry request message, wherein the second write privilege is different from the first write privilege, wherein the second device is permitted to modify the registry request message according to the first write privilege and the second write privilege.

11. The device of claim 10, wherein the first portion of the registry request message includes a header and the second portion includes a payload of the registry request message, and the header includes public contact point information corresponding to the device, and the payload includes private contact point information corresponding to the device.

12. The device of claim 11, wherein the registry request generation module is further configured to write an internet protocol (IP) address and a port number corresponding to the device, to both the header and the payload of the registry request message.

13. The device of claim 10, wherein the registry request message includes one or more peer device identifiers identifying the one or more peer devices associated with the device.

14. The device of claim 10, wherein the peer contact point information includes public contact point information and private contact point information for each peer device of the one or more peer devices.

15. The device of claim 10, wherein the second device is permitted to modify a portion of the response message.

16. A method, comprising:
at a shared contact point network entity having a memory, a non-transitory computer readable storage medium and one or more processors:
obtaining through a third device a first registry request message from a first device, wherein the first registry request message includes a first portion and a second portion, wherein the first portion is characterized by a first write privilege for the first registry request message and the second portion is characterized by a second write privilege for the first registry request message, wherein the second write privilege is different from the first write privilege, and wherein the third device is permitted to modify the first registry request message according to the first write privilege and the second write privilege;
obtaining peer contact point information corresponding to one or more peer devices of the first device, from a contact point registry; and
generating a first response message including the peer contact point information corresponding to one or more peer devices of the first device.

17. The method of claim 16, wherein the first portion of the first registry request message includes a header comprising public contact point information for the first device, and the second portion of the first registry request message includes a payload comprising private contact point information for the first device.

18. The method of claim 16, further comprising:
determining contact point information of the first device by identifying a first internet protocol (IP) address and port from the first portion and a second IP address and port from the second portion; and
updating the contact point registry with the contact point information of the first device.

19. The method of claim 18, wherein updating the contact point registry with the contact point information of the first device is performed in accordance with a determination that an entry in the contact point registry corresponding to the first device does not contain the determined contact point information of the first device.

20. The method of claim 16, further comprising:
determining one or more peer device identifiers identifying one or more respective peer devices, from the first registry request message; and
obtaining peer contact point information from the contact point registry in accordance with the one or more identified peer devices.

21. The method of claim 20, wherein the contact point registry includes an entry corresponding to the first device, and the entry includes the one or more peer device identifiers of the first registry request message.

22. The method of claim 16, further comprising:
obtaining a second registry request message from a second device;
obtaining peer contact point information corresponding to one or more peer devices of the second device, from the contact point registry; and
generating a second response message including peer contact point information corresponding to one or more peer devices of the second device.

23. The method of claim 16, wherein the third device is permitted to modify a portion of the first response message.

* * * * *